US005804221A

United States Patent [19]

Planeta et al.

[11] Patent Number: 5,804,221

[45] Date of Patent: Sep. 8, 1998

[54] AIR RING FOR COOLING BLOWN PLASTIC FILM

[75] Inventors: Mirek Planeta, Mississauga; Nghia C. Dang, Toronto, both of Canada

[73] Assignee: Macro Engineering & Technology Inc., Mississauga, Canada

[21] Appl. No.: 708,763

[22] Filed: Sep. 5, 1996

[51] Int. Cl.[6] .......... B29C 47/88

[52] U.S. Cl. .......... 425/72.1; 264/40.3; 264/167; 264/566; 425/326.1; 425/387.1

[58] Field of Search .......... 425/72.1, 141, 425/326.1, 387.1; 264/40.1, 40.3, 167, 566, 569

[56] References Cited

U.S. PATENT DOCUMENTS 4,209,475 6/1980 Herrington et al. .......... 264/40.1
4,259,047 3/1981 Cole .......... 425/72 R
4,505,657 3/1985 Ikeya .......... 425/72 R
4,826,414 5/1989 Planeta .......... 425/72.1
5,281,375 1/1994 Konermann .......... 264/40.3
5,288,219 2/1994 Smith .......... 425/72.1
5,468,134 11/1995 Cree .......... 425/72.1
5,562,926 10/1996 Karl .......... 425/326.1

*Primary Examiner*—James P. Mackey
*Assistant Examiner*—Iurie A. Schwartz
*Attorney, Agent, or Firm*—Rogers & Scott

[57] ABSTRACT

An air ring for supplying cooling air to a hot extruded plastic film after the film has been extruded from an annular extrusion die at an elevated temperature has an annular body which surrounds the tubular film after the film has left the extrusion die. The body has a circumferentially extending air passage through which air can be supplied from an external source and which directs cooling air from the passage between the body and the film with a venturi-like effect. A circumferentially extending series of individually operable actuators are each operable to vary the venturi-like effect at its circumferential location and cause the film to become nearer to or further from the body at said location to cause the thickness of the film at said location to decrease or increase.

3 Claims, 3 Drawing Sheets

14
12
22
A
24
25
58
18
40
32
20
26
28
44
48
52
54
56
34
36
38
42
30
50
46
16

86
86
86
88
88
88
88
88
80

14
80
86
82
90
84
212
58
25
18
16
24
56
A
22
86
90
84
A
52
56
54
25
58
20
24

AIR RING FOR COOLING BLOWN PLASTIC FILM

BACKGROUND OF THE INVENTION

This invention relates to air rings for cooling blown plastic film, that is to say air rings for supplying cooling air to an extruded tubular plastic film after the film has been extruded from an annular extrusion die at an elevated temperature, i.e. above ambient temperature.

An air ring of this kind is described in U.S. Pat. No. 5,464,336 (Planeta) issued Nov. 7, 1995, the contents of which are hereby incorporated herein by reference. One of the problems encountered in extruding tubular plastic film in this manner is gauge control, i.e. control of the thickness of the film. It has been proposed to effect gauge control by adjusting the angle at which cooling air contacts the film at different circumferential locations around the film as the film leaves the extrusion die. One such proposal is described in U.S. Pat. No. 4,209,475 (Herrington et al.) issued Jun. 24, 1980, which teaches the use of a circumferentially arranged series of individually adjustable deflector blades to alter the angle at which the air contacts the film. However, such an arrangement does not provide as much gauge control as desired and is difficult to adjust manually.

It is therefore an object of the present invention to provide an air ring with an improved arrangement for effecting gauge control of the film as the film leaves the extrusion die so that a greater range of and/or more readily adjustable gauge control can be achieved.

SUMMARY OF THE INVENTION

According to the invention, an air ring has an annular body which surrounds the tubular film after the film has left the extrusion die, the body having a circumferentially extending air passage through which air can be supplied from an external source and directs the cooling air from the circumferentially extending air passage between the body and the film with a venturi-like effect, and a circumferentially extending series of individually operable actuators each operable to vary the venturi-like effect at its circumferential location and cause the film to become nearer to or further from the body at said location to cause the thickness of the film at said location to decrease or increase.

According to one embodiment of the invention, an annular diaphragm may be located in the circumferentially-extending passage, with each actuator being operable to move an adjacent portion of the annular diaphragm to vary the area of an adjacent portion of the circumferential-extending air passage.

Each actuator assembly may have a two arm lever pivotally mounted on the annular body member, and an actuator member operable to move one arm of the lever and pivot the lever to cause the other arm to effect the movement of the adjacent portion of the annular diaphragm.

The actuator member may have a length which varies with temperature, with the actuator also having an electrical heater associated therewith for heating the actuator member to cause an increase in length thereof and consequent pivoting movement of the lever.

Alternatively, the actuators may be servo-operated actuators, piezoelectrically-operated actuators, electro magnetically-operated actuators or any other suitable type of actuator.

According to another embodiment of the invention, an air guide ring may surround the upper portion of the annular body of the air ring in spaced relationship thereto and project thereabove to form an air flow passage between the guide ring and the air ring body, with a circumferentially extending series of individually operable flap members being operable to vary the flow of air through the air flow passage between the guide ring and the air ring body and thereby vary the venturi-like effect of the flow of cooling air between the air ring body and the plastic film.

The flap members may be pivotally mounted on the air guide ring, with the air guide ring carrying a series of individually operable actuators to vary the positions of the flap members.

According to yet another embodiment of the invention, an adjustable iris diaphragm with individually adjustable arcuate segments arranged in a circumferential series may be mounted above the annular body such that the tubular film passes therethrough, each actuator being operable to adjust the radial position of a respective diaphragm segment.

BRIEF DESCRIPTION OF THE DRAWINGS

Embodiments of the invention will now be described, by way of example, with reference to the accompanying drawings, of which.

DESCRIPTION OF THE PREFERRED EMBODIMENTS

Figures 1, 2:
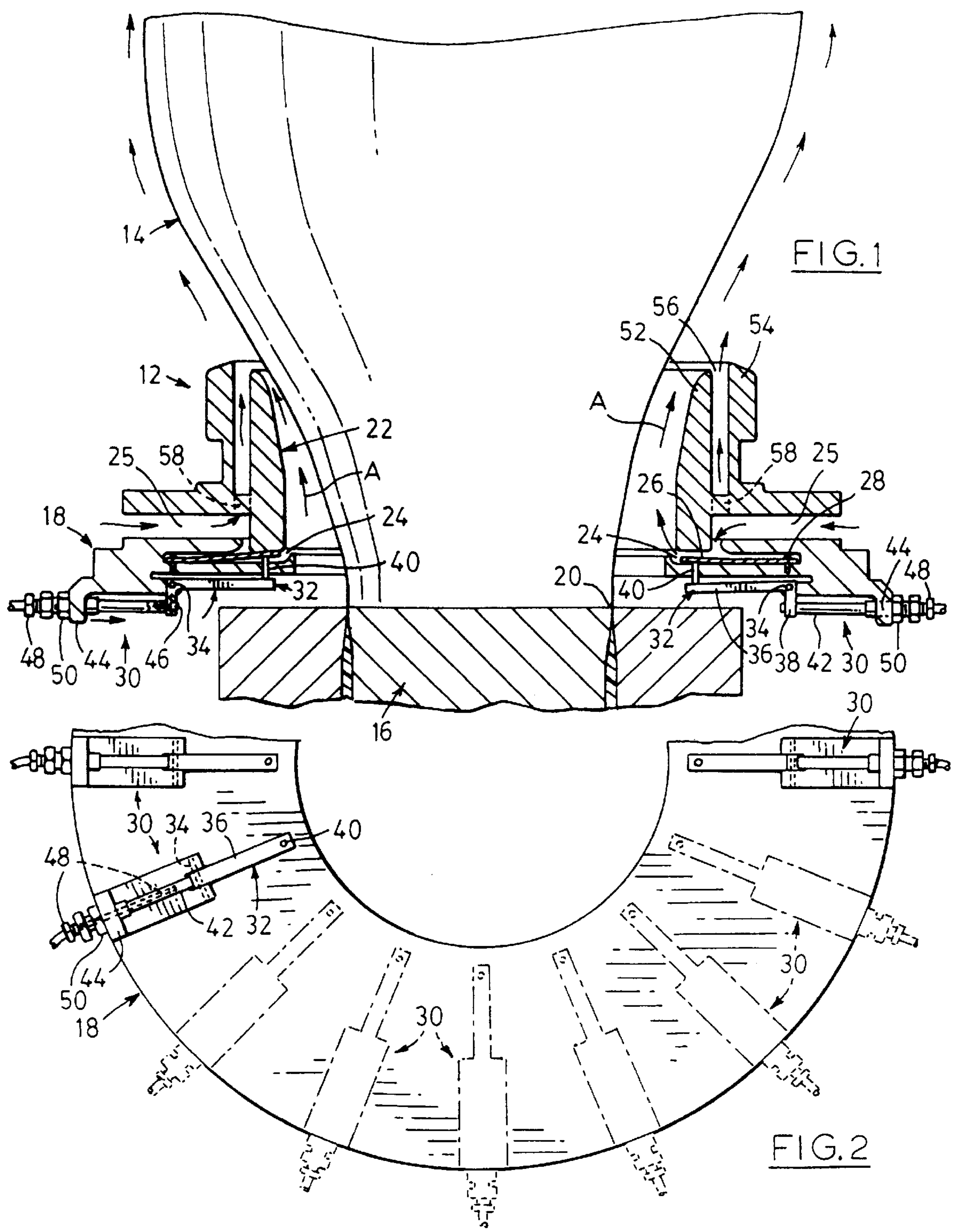
FIG. 1 is a vertical sectional view of an air ring in accordance with one embodiment of the invention mounted on an annular extrusion die.
FIG. 2 is a bottom view of part of the air ring of FIG. 1.

Referring first to FIGS. 1 and 2 of the drawings, an air ring 12 in accordance with one embodiment of the invention is provided for supplying air to an extruded tubular plastic film 14 after the film 14 has been extruded from an annular extrusion die 16 at an elevated temperature.

The air ring 12 has a lower annular body member 18 secured in known manner (not shown) to the extrusion die 16 which has an annular extrusion orifice 20 from which the tubular film 14 is extruded. An upper annular body member 22 is mounted above the lower annular body member 18 in known manner (not shown) in spaced relationship therewith to form a circumferentially extending air passage 24 to which cooling air can be supplied through a passage 25 from an external cooling air source (not shown). The cooling air passes from the passage 24 between the upper annular body member 22 and the film 14 with a venturi-like effect, the flow of air being indicated by arrows A.

A flexible annular diaphragm 26 is located in the circumferentially extending passage 24 with its outer peripheral portion secured by a series of circumferentially spaced pins 28 to the lower annular body member 18.

A series of individually operable actuators 30 are circumferentially spaced around the lower annular body member 18 beneath the annular diaphragm 26. Each actuator 30 comprises a two arm lever 32 pivotally mounted by a pin 34 on the lower annular body member 18. As will be readily apparent from FIG. 1, one arm 36 of the lever 32 is considerably longer than the other arm 38. An actuator pin 40 slidably mounted in an aperture in the lower annular body member 18 has its lower end engaging the lever arm 36 and its upper end engaging the portion of the annular diaphragm 26 thereabove.

Each actuator 30 also includes a heated hollow bolt 42 having one end mounted in an aperture in a downwardly extending wall portion 44 on the lower annular body member 18. The other end of bolt 42 is secured to the lever arm 38 by a screw 46. An electrical heater cartridge 48 extends into the bolt 42 from the end thereof which is mounted in the aperture in the wall portion 44. A lock nut 50 holds the bolt 42 in position.

In use, the supply of electrical power to each electrical heater cartridge 48 can be varied to cause the bolt 42 to increase in length (i.e. expand) with increased heat or decrease in length (contract) with decreased heat from the electrical heater cartridge 48. Increase in electrical power increases the length of bolt 42 with consequent pivoting movement of lever 32 and upward movement of pin 40. Such upward movement of pin 40 causes the adjacent part of diaphragm 26 to move upwardly with consequent restriction of the effective area of passage 24 at that location around the circumference of the film 14, as shown on the right hand side of FIG. 1. Conversely, decrease of electrical power with contraction in length of the bolt 42 causes the pin 40 and adjacent portion of the diaphragm 26 to lower, thereby increasing the effective area of passage 24 at that location. Such heated bolts are known per se and are usually used for controlling the size of the die orifice 20.

Thus, the circumferential air passage 24 can be individually adjusted at different positions around its circumference. As will be noted from FIG. 2, the air ring 12 of the above described embodiment has sixteen actuator assemblies 30, with there accordingly being provision for adjustment of the air passage 24 approximately every 22.5 degrees around its circumference.

If an actuator 30 is operated to vary the venturi-like effect between the body member 22 and the film 14 by decreasing the area of passage 24 at its circumferential location and thereby decrease the flow of air at this location, the portion of the film 14 passing that location moves nearer the body member 22 (as shown on the left of FIG. 1) so as to expand more. As a result, this portion of the film 14 becomes more stretched and hence thinner and therefore cools faster with consequent lowering of the frost line at this location. Conversely, if an actuator 30 is operated to vary the venturi-like effect between the body member 22 and the film 14 by increasing the area of passage 24 and thereby increasing the flow of air at the location concerned, the portion of the film passing the location moves away from the body member 22 (as shown on the right of FIG. 1) so as to expand less. As a result, this portion of the film 14 is less stretched and hence thicker and therefore cools slower with consequent raising of the frost line at this location.

Each actuator 30 is adjusted in response to variations in thickness (gauge) of the tubular film 14 leaving the air ring 12. Such adjustment may be manually effected or automatically in response to gauge variations. Initial adjustment of the positions of the heated bolts 42 may be effected by means of the lock nuts 50.

It will be noted that, in this embodiment, the upper annular body member 22 has an inner tubular portion 52 and an outer tubular portion 54 surrounding the inner tubular portion 52 and spaced therefrom to form a circumferentially extending air passage 56. Cooling air is supplied to the air passage 56 from the air supply passage 25 through circumferentially spaced apertures 58 in the body member 18. As shown in FIG. 1, cooling air flowing upwardly through the circumferential passage 56 leaves the upper end of the air ring 12 to merge with the cooling air flowing upwardly between the air ring 12 and the plastic film 14 from the passage 24.

The actuators 30, instead of comprising heated bolts, may be servo-operated actuators, piezoelectrically-operated actuators, electromagnetically-operated actuators or any other suitable type of actuator.

Figure 4:
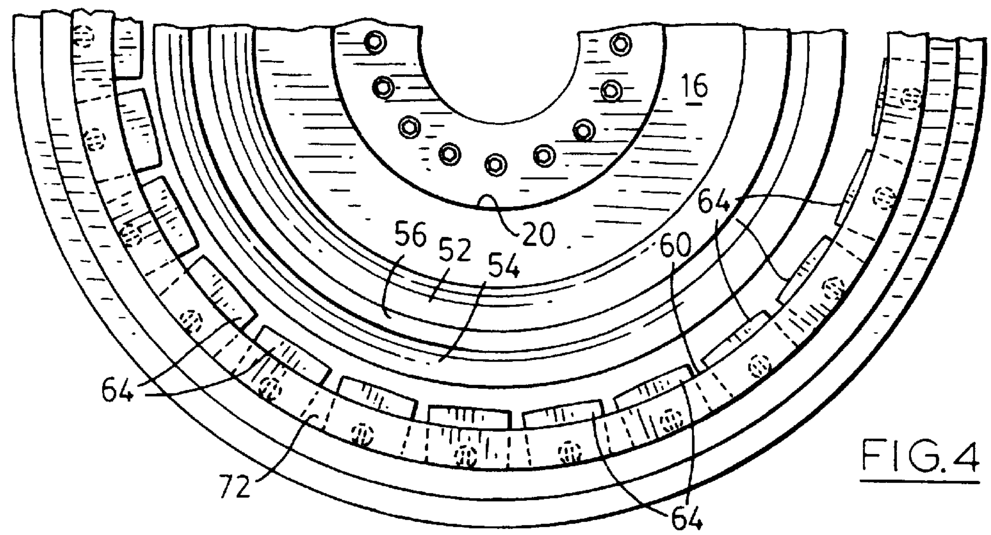
FIG. 4 is a plan view of part of the air ring of FIG. 3.
Figure 3:
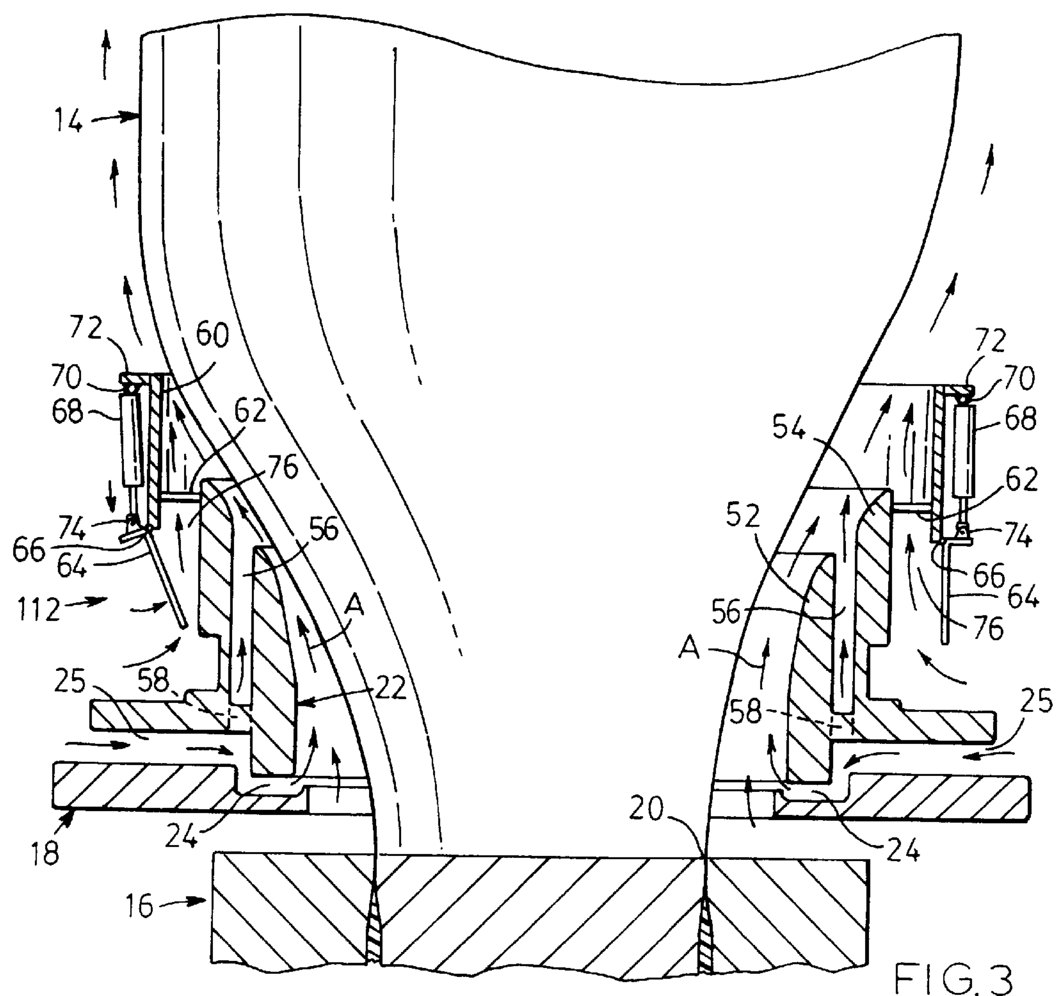
FIG. 3 is a vertical sectional view of an air ring in accordance with another embodiment of the invention.

Referring now to FIGS. 3 and 4, an air ring 112 in accordance with a second embodiment of the invention has various parts which are the same as parts of the embodiment described with reference to FIGS. 1 and 2 and the same reference numerals will be used to indicate such parts.

Whereas in the embodiment of FIGS. 1 and 2 the venturi-like effect of the flow of air between the body member 22 and the plastic film 14 was varied by decreasing or increasing the area of passage 24 at a desired circumferential location, the venturieffect variation is effected in the embodiment of FIGS. 3 and 4 by adjusting the flow of air between the upper end portion of the upper body member 22 and an air flow guide ring 60 surrounding the upper end portion of the upper body member 22 and projecting thereabove, the guide ring 60 being secured to the upper body portion 22 by circumferentially-spaced struts 62.

A series of closely-spaced flap members 64 are pivotally secured at 66 to the lower end of the air guide ring 60, the series extending completely around the lower end of the guide ring 60. A series of actuators 68 extends around the exterior of the guide ring 60. Each actuator 68 is pivotally secured at its upper end 70 to an annular support 72 secured to the upper end of the guide ring 60 and projecting outwardly therefrom, and is secured at its lower end 74 to a respective flap member 64.

The actuators 68 may be servo-operated actuators, piezoelectrically-operated actuators, electromagnetically-operated actuators or any other suitable type of actuator and are merely illustrated in a symbolic manner in FIG. 3.

If an actuator 68 is operated to vary the venturi-like effect between the body member 22 and the film 14 by moving a flap member 64 radially inwardly to restrict the flow of air in the passage 76 between the guide ring 60 and the upper body member 22 (as shown on the left of FIG. 3), the portion of the film 14 passing the circumferential location moves nearer the body member 22 and the guide ring 60 so as to expand more. As a result, this portion of the film 14 becomes more stretched and hence thinner and therefore cools faster with consequent lowering of the frost line at this location. Conversely, if an actuator 68 is operated to vary the venturi-like effect by moving a flap member 64 to less restrict the flow of air in the passage 76 (as shown on the right of FIG. 3), the portion of the film 14 passing that circumferential location moves away from the body member 22 and guide ring 60 so as to expand less. As a result, this portion of the film 14 is less stretched and therefore thicker and therefore cools slower with consequent raising of the frost line at this location. Each actuator 68 is adjusted in response to variations in gauge of the tubular film 14 leaving the air ring 12.

Figure 6:
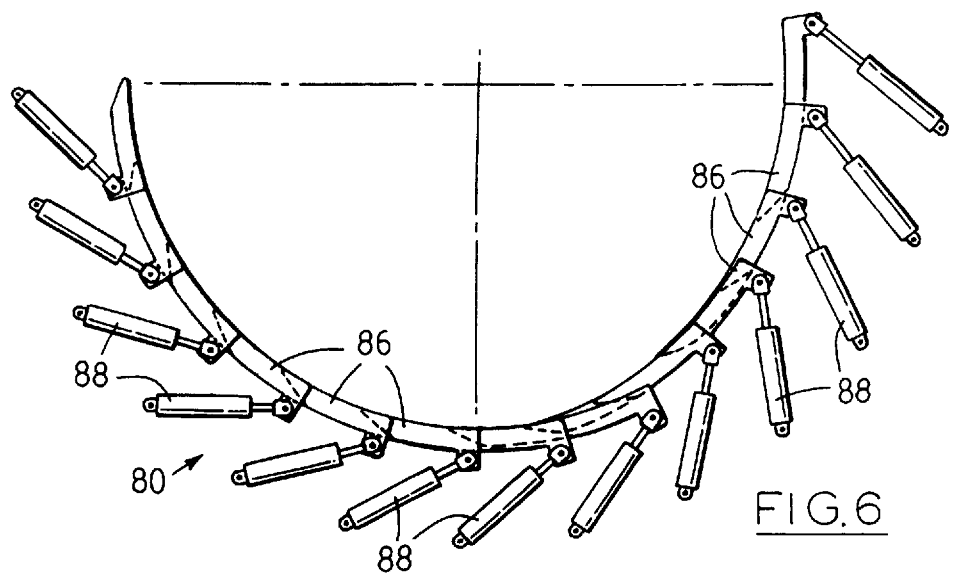
FIG. 6 is a plan view of part of the air ring of FIG. 5, also showing the actuators.
Figure 5:
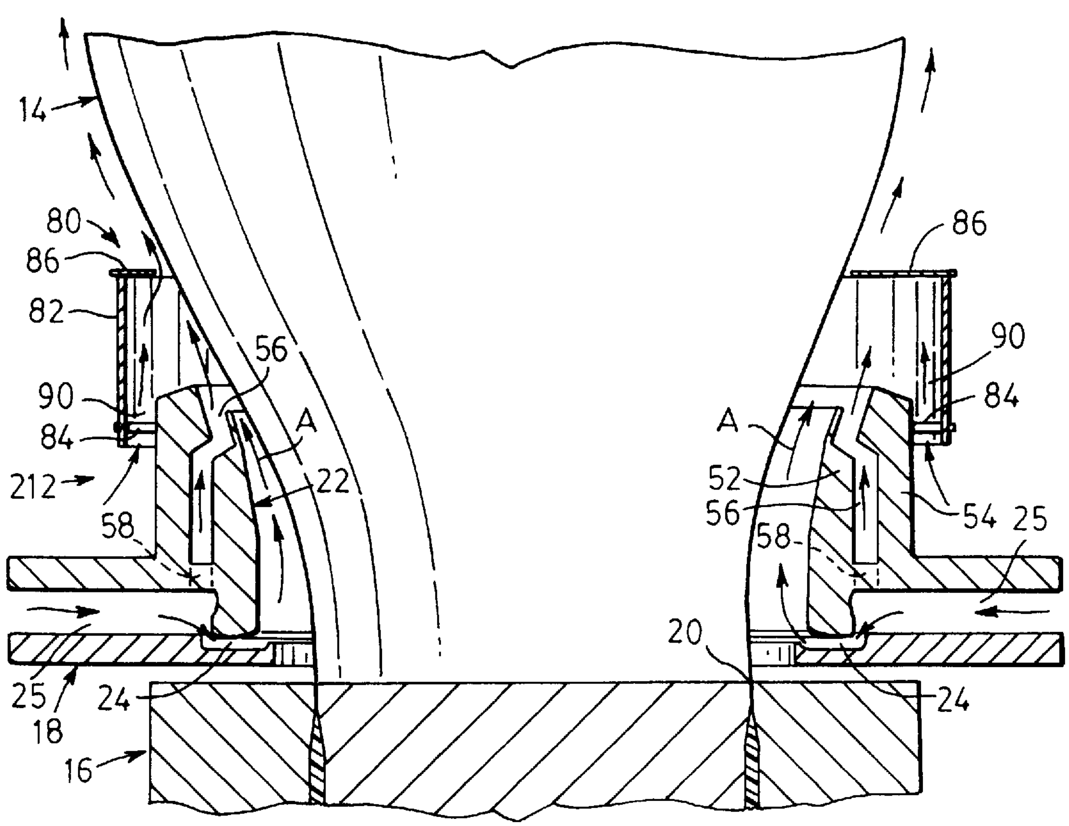
FIG. 5 is a vertical sectional view of an air ring in accordance with a third embodiment of the invention, with the actuators being omitted for clarity.

Referring now to FIGS. 5 and 6, an air ring 212 in accordance with a third embodiment of the invention also has various parts which are the same as in previous embodiments and again the same reference numerals will be used to identify such parts.

In this embodiment, the venturi-like effect is varied by adjusting the flow of cooling air above the upper body member 22 by adjustment of an iris diaphragm arrangement 80 through which the plastic film 14 passes.

The iris diaphragm arrangement 80 is mounted near the upper end of an air flow guide ring 82 which surrounds the upper portion of the upper body member 22 in spaced relation therewith and projects thereabove. The guide ring 82 is secured to the upper body portion 22 by circumferentially-spaced struts 84. The iris diaphragm arrangement 80 has an annular series of movable arcuate segments 86, the radial orientation of each segment 86 being adjustable by a separate actuator 88, one end of which is connected to the segment 86 and the other end of which is connected to the guide ring 82. As in previous embodiments, the actuators 88 may be servo-operated actuators, piezoelectrically-operated actuators, electromagnetically-operated actuators or any other suitable type of actuator and are merely illustrated in a symbolic manner in FIG. 6.

If the actuators 88 at a particular circumferential location are operated to increase the venturi-like effect between the upper body member 22 and film 14 by moving the associated diaphragm segments 86 radially outwardly to increase the flow of air in the passage 90 between the guide ring 82 and the upper body member 22 and also the flow of air through the air ring 212, the portion of the film 14 passing this circumferential location expands more as shown on the left of FIG. 5. As a result, this portion of the film 14 becomes more stretched and hence thinner and therefore cools faster with consequent lowering of the frost line at this location. Conversely, if the actuators 88 at a particular circumferential location are operated to vary the venturi-like effect by moving the associated segments 86 radially inwardly to restrict the flow of air in the passage 90 and through the air ring 212, the portion of the film 14 passing this circumferential location expands less as shown on the right of FIG. 5. As a result, this portion of the film 14 becomes less stretched and hence thicker and therefore cools slower with consequent raising of the frost line at this location. Each actuator 88 is adjusted in response to variations in gauge of the tubular film 14 leaving the air ring 12.

From the foregoing description of embodiments of the invention, a person skilled in the art will be able to envisage further embodiments of the invention, i.e. other ways of varying the venturi-like effect of the flow of cooling air. The scope of the invention is defined in the appended claims.

We claim:

1. An air ring for supplying cooling air to a hot extruded plastic film after the film has been extruded from an annular extrusion die at an elevated temperature, said air ring having:

an annular body which surrounds the tubular film after the film has left the extrusion die, said body having a circumferentially extending air passage through which air can be supplied from an external source and which directs cooling air from the passage between the body and the film with a venturi-like effect, a circumferentially extending series of individually operable actuators each operable to vary the venturi-like effect at its circumferential location and cause the film to become nearer to or further from the body at said location to cause the thickness of the film at said location to decrease or increase, and an annular diaphragm located in said circumferentially extending air passage, said actuators each being operable to move an adjacent portion of the annular diaphragm to vary the area of an adjacent portion of the circumferentially extending air passage, each actuator having a two arm lever pivotally mounted on the annular body, and an actuator member operable to move one arm of the lever and pivot said lever to cause the other arm to effect said movement of said adjacent portion of the annular diaphragm, and each actuator member having a length which varies with temperature, the actuator also having an electrical heater for heating the actuator member to cause an increase in length thereof and consequent pivoting movement of the lever.

2. An air ring for supplying cooling air to a hot extruded plastic film after the film has been extruded from an annular extrusion die at an elevated temperature, said air ring having:

an annular body which surrounds the tubular film after the film has left the extrusion die, said body having a circumferentially extending air passage through which air can be supplied from an external source and which directs cooling air from the passage between the body and the film with a venturi-like effect, a circumferentially extending series of individually operable actuators each operable to vary the venturi-like effect at its circumferential location and cause the film to become nearer to or further from the body at said location to cause the thickness of the film at said location to decrease or increase, an air guide ring surrounding the upper portion of the annular body of the air ring in spaced relationship thereto and projecting thereabove to form an air flow passage between the guide ring and the air ring body, and a circumferentially extending series of individually operable flap members operable to vary the flow of air through said air flow passage between the air guide ring and the air ring body and thereby vary the venturi-like effect of the flow of cooling air between the air ring body and the plastic film.

3. An air ring according to claim 2 wherein the flap members are pivotally mounted on the air guide ring, and the air guide ring carries a series of individually operable actuators to vary the positions of the flap members.

* * * * *